Figure 1:
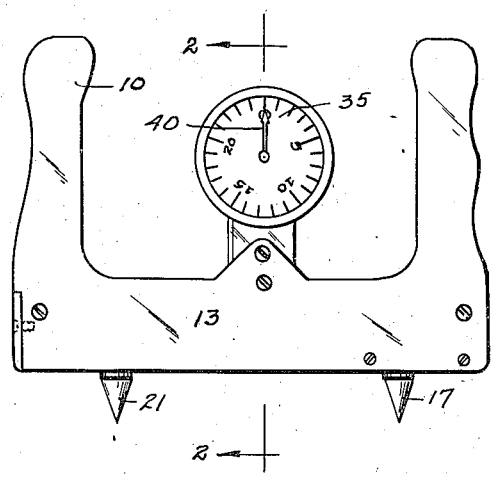

Jan. 15, 1946.   J. T. BANNER   2,392,899
ELONGATION GAUGE
Filed Oct. 6, 1943

INVENTOR.
JOSEPH T. BANNER
BY
*Bates, Teare, & McBean*
ATTORNEYS

Patented Jan. 15, 1946

2,392,899

UNITED STATES PATENT OFFICE 2,392,899

ELONGATION GAUGE

Joseph T. Banner, Cleveland, Ohio

Application October 6, 1943, Serial No. 505,131

6 Claims. (Cl. 33—147)

This invention relates to an instrument for readily indicating the elongation of a piece previously marked and thereafter stretched. Such measurements must be frequently made in determining whether materials comply with specifications, and as a basis of various computations, and an instrument for this purpose, which may be quickly applied and read at a glance, even though the actual elongation be very small, is highly desirable. My gauge accomplishes this result.

More particularly, my invention provides a frame adapted to be readily grasped in the operator's hand and having two cooperating points, one fixed in use and the other movable, adapted to engage marks on the work, the movable point being connected through multiplying mechanism with a pointer coacting with a settable dial.

In use the points are spaced in accordance with the previous marking on a test piece, the dial being set to zero. Then, after the test piece has been stretched or pulled apart, the distance between the marks thereon is again measured, the movable point of the instrument thus taking a relatively different position than formerly and the amount of elongation being shown by the resulting new position of the pointer on the dial. The intermediate multiplying mechanism allows the travel of the pointer to be readily observed for a very small movement of the movable point on the gauge.

My invention is hereinafter more fully described in connection with a preferred embodiment thereof illustrated in the drawing, and the above outlined features, and others contributing to the effectiveness of the instrument are fully explained.

Figure 2:
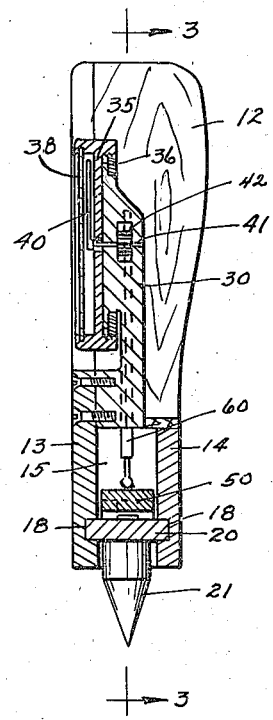
Figure 3:
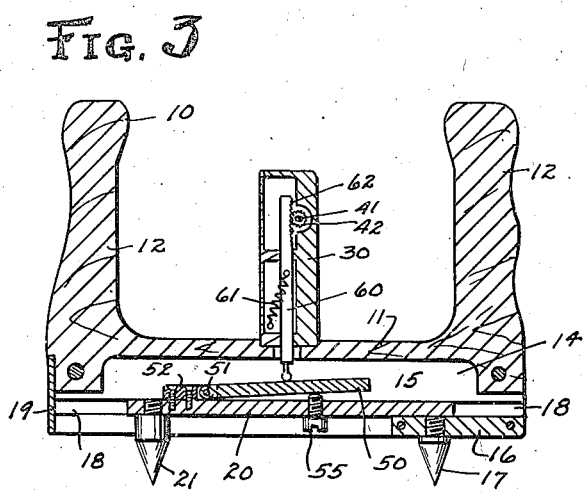

In the drawing, Fig. 1 is a side elevation of my gauge, Fig. 2 is a cross section thereof in a plane indicated by the line 2—2 on Fig. 1; Fig. 3 is a longitudinal section in a plane indicated by the line 3—3 on Fig. 2.

The frame of my device, as shown in the drawing, comprises preferably a U-shaped member 10 formed so as to be readily grasped by the operator's hand and carrying various parts of the device, with the points to engage the work projecting downwardly and the dial located between the arms of the U.

As shown in the drawing, this U-shaped frame is a built up member comprising a suitable block having a bottom portion 11 and upright end portions 12, this block being faced by a correspondingly shaped plate 13. On the opposite side the frame is shown as carrying a plate 14 parallel with and spaced from the lower portion of the plate 13. This is thus a channel 15 in the lower portion of the frame available for the mechanism about to be described.

Extending across the bottom of the channel 15, I have shown a fixed plate 16 carrying the fixed point 17. The plates 13 and 14 are longitudinally grooved, as shown at 18. In these grooves is mounted a slide 20 carrying the movable point 21. The channel is shown as closed at its end beyond the movable point by a cross plate 19.

Mounted on the intermediate portion of the frame is an upstanding housing 30 carrying the dial. The multiplying mechanism connecting the slide 20 with the dial is contained in this housing and in the channel 15 and will be presently described. The dial 35 is circularly graduated and marked, as indicated in Fig. 1, and is shown as a circular member mounted on a circular head of the housing 30 and retained thereon by reason of a ring nut 36 screwed into an overhanging flange of the dial member, as shown in Fig. 2. The dial member carries a glass front 38, and between this front and the dial face 35 is mounted the indicating pointer 40 on a suitable arbor 41.

The multiplying mechanism referred to between the slide 20 and the pointer 40 comprises an adjustably positioned inclined bar 50 on the slide and a member 60 slidably coacting with the face of the bar and suitably geared to the arbor 41. More particularly, as shown in Fig. 3, the inclined bar 50 is hinged at 51 to a block 52 which is secured to the slide 20. A screw 55 threaded in the slide engages the underside of the inclined bar and determines the inclination thereof. As shown in Figs. 2 and 3, the member 60 of the multiplying mechanism comprises a bar slidable in the housing 30 and maintained in contact with the inclined bar 50 by a spring 61. This bar 60 is shown as a rack having teeth 62 meshing with a pinion 42 on the arbor 41.

It follows from the above described construction that if the point 21 is moved toward the left in Fig. 3, the inclined bar 50 will shove upwardly on the rack bar 60 and thereby rotate the pointer. The radius of the pinion 41 is so small in comparison to the length of the pointer that such pointer travels a considerable distance for a very slight movement of the rack bar 60. I have found it convenient, for instance, to so proportion the multiplying mechanism that one mark on the scale may represent the difference of a .02 inch between the original and ultimate positions of the point 21. That is to say, with the pointer on zero when the test block is given its preliminary measurement, then an elongation of a block of .02 inch would cause the pointer, on re-measurement, to be at the first mark on the dial.

As the original spacing of the marks on test pieces, intended to be constant, may vary somewhat, the dial itself is adjustably mounted so that it can be readily turned by the operator grasping the periphery of the dial member and turning it one way or the other until the pointer stands at zero.

In operation of my instrument for measuring the elongation of test pieces, it is customary to make slight indentations in the test piece longitudinally spaced a standard distance as, for instance, two inches. When such piece is to be tested the instrument is set with the points in such marks and the dial is rotated if necessary to bring the zero mark of the dial in accurate registration with the pointer. Then, after the test piece has been elongated, the instrument is again applied, the movable projection 21 being manually shifted slightly away from the fixed projection, if necessary, and the points are placed in the two indentations of the elongated test piece. The dial is then read and the distance the pointer has traveled from the zero point indicates the amount of elongation.

Should it be desired to make a greater turn of the pointer for a given movement of the movable point 21, this may be effected by replacing the screw 55 by a longer screw, thus holding the inclined plate at a greater angle to the slide and giving a greater movement to the pointer for a given movement to the point 21. On the other hand, a shorter screw than the screw 55 would reduce the movement of the pointer for a given movement of the movable point. A single screw 55, adjustable in the slide 20, may be employed if desired, but in the interest of certainty I prefer to turn the screw into a definite position by reason of its head abutting the underface of the slide and to provide for the change in the calibration by furnishing screws of different lengths.

It will be seen that my instrument is very simple in construction and is available for ready application to a test piece to indicate in a visible manner the amount of elongation thereof, though the latter may be only a few thousandths of an inch. There is nothing about the instrument to get out of order, and it may readily lie on a convenient support and be picked up and quickly applied by the operator.

I claim:

1. An elongation gauge comprising a rigid frame, a point carried thereby, a movable slide on the frame carrying a second point, an inclined bar hingedly carried by the slide, means for holding said bar at a definite angle to the slide, a dial indicator and pointer carried by the frame, and a member for operating such indicator and bearing against the face of the incline and adapted to be moved thereby.

2. In an elongation gauge, the combination of a frame carrying a projecting point, a slide movably mounted on the frame and carrying a second point, a bar hinged to the slide, a screw mounted in the slide and abutting the bar to determine the angle thereof, an indicator carried by the frame, and an operating member for the indicator abutting the face of the inclined bar and adapted to be moved thereby as the slide moves.

3. A frame adapted to be grasped by the operator's hand, relatively fixed and movable points thereon, a movable slide on the frame carrying the second point and carrying an inclined surface, a settable dial carried by the frame, a pointer coacting with said dial, and multiplying mechanism coacting with said inclined surface and movable by it and drivingly connected to said pointer.

4. In an elongation gauge, the combination of a substantially U-shaped frame adapted to be grasped by the operator's hand, a downwardly projecting fixed point carried by the frame, a longitudinal slide within the frame having a downwardly projecting point, a settable dial carried by the frame between the arms of the U, a pointer coacting with the dial, an inclined bar pivotally mounted on the slide, means for adjusting the angle of the bar, an abutment member movably mounted in the frame and engaging the inclined face of said bar and adapted to be moved thereby when the slide moves the bar, and connecting mechanism between the abutment member and pointer.

5. An elongation gauge having in combination a frame, a point carried thereby adapted to engage the work to be tested, a second point also adapted to engage the work to be tested, said second point being mounted on the frame in a manner enabling its movement toward and from the point first mentioned, an inclined member connected with said movable point so as to be moved therewith, means for varying the incline of said member, an indicator, and mechanism for operating the same engaging the inclined member and movable by it, whereby motion may be transmitted from the movable point to the indicator in a ratio variable by variation of the angle of the incline.

6. An elongation gauge comprising a substantially U-shaped frame adapted to be grasped by the operator's hand, the upright portions of the U being of sufficient extent and close enough to each other so that they may be engaged respectively by the thumb and fingers of one hand, a point projecting from the bottom of the frame, a slide within the frame having a downwardly projecting point, an inclined bar pivotally mounted on the slide, means for adjusting the angle of the bar, an abutment member movably mounted in the frame and engaging the inclined face of said bar and adapted to be moved thereby when the slide moves the bar, an indicator carried by the frame between the two arms of the U, and mechanism connecting the indicator with the inclined bar.

JOSEPH T. BANNER.